United States Patent

[11] 3,547,486

[72] Inventors Kurt Herzer
Karlsruhe, Durlach;
Wolfgang Mertens, Karlsruhe, Germany
[21] Appl. No. 801,962
[22] Filed Feb. 25, 1969
[45] Patented Dec. 15, 1970
[73] Assignee Firma Kurt Herzer
Karlsruhe, Germany
[32] Priority Aug. 31, 1968
[33] Germany
[31] No. 1,780,322

[54] ADJUSTABLE HEAD REST FOR VEHICLE SEATS
8 Claims, 3 Drawing Figs.
[52] U.S. Cl. ..................................................... 297/408,
B297/397, 297/410
[51] Int. Cl. ...................................................... A47c 7/36,
A47c 7/42
[50] Field of Search ........................................... 297/391,
397—399, 403, 409, 410

[56] References Cited
UNITED STATES PATENTS
2,831,350 4/1958 Chiopelas et al. ............ 297/397
3,186,763 6/1965 Ferrara......................... 297/410
3,328,082 6/1967 Lilleso.......................... 297/397

*Primary Examiner*—Casmir A. Nunberg
*Attorney*—Edwin E. Greigg

ABSTRACT: An angularly and vertically adjustable head rest which is secured to the top of a back rest forming part of a vehicle seat. The head rest may be immobilized in a desired height position by a locking mechanism disposed entirely within, and surrounded by, the foam plastic cushion of the head rest. For height adjustment, the locking mechanism may be released by manually engaging a lever extending slightly beyond the cushion. In the back rest there is disposed a mechanism for locking the head rest in the desired angular position. The last-named locking mechanism is released when a lateral manual pressure is exerted to said head rest.

PATENTED DEC 15 1970
3,547,486
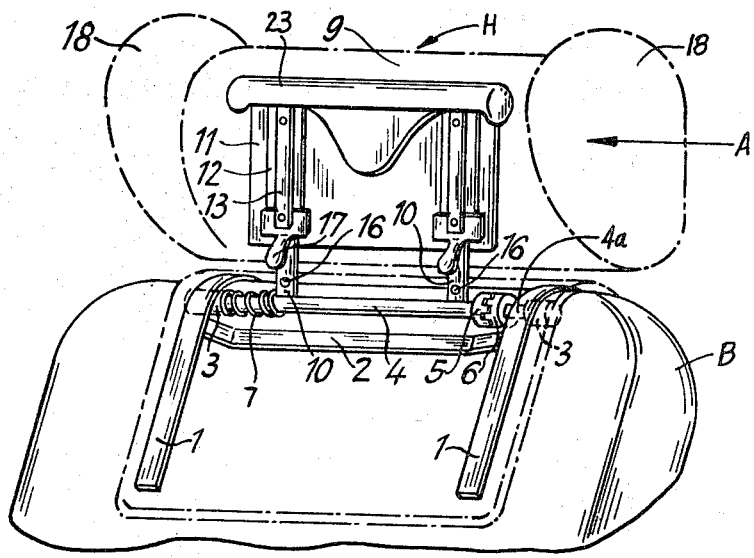
Fig.1
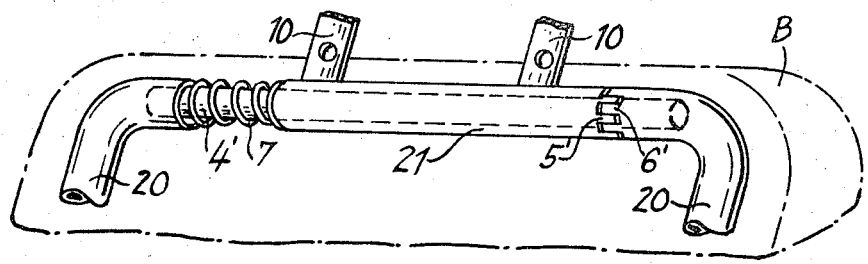
Fig.2
Fig.3
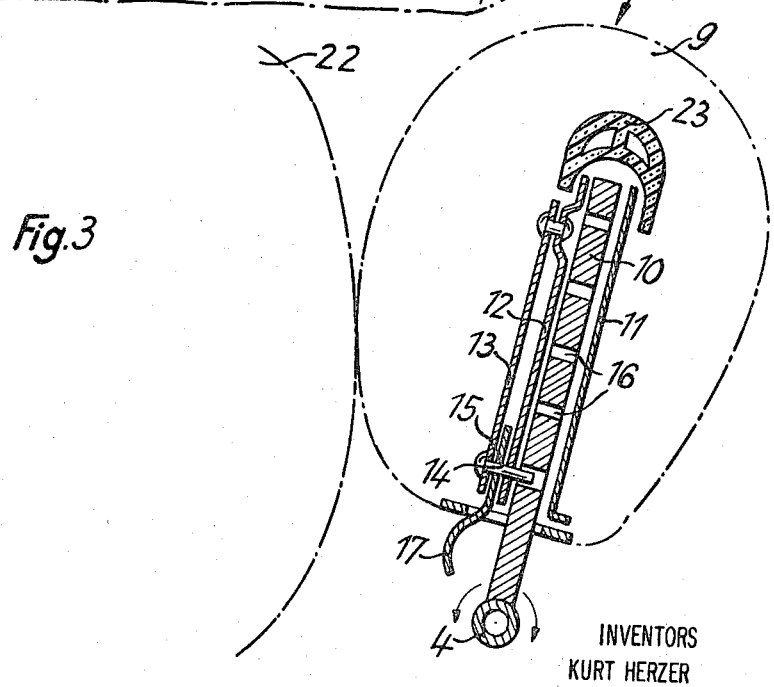
INVENTORS
KURT HERZER
WOLFGANG MERTENS
BY
ATTORNEY

ADJUSTABLE HEAD REST FOR VEHICLE SEATS

BACKGROUND OF THE INVENTION

Headrests that may be attached to or firmly built into the backrest of vehicle seats are widely known in the art.

Insofar as the adjustable headrests are not only immobilized by detents but are also firmly locked, they do not always absorb the forces generated during accidents and are, without exception, adjustable by operating means which extend outwardly into the danger zone and thereby constitute substantial additional safety hazards.

In order to safely support the occupant's head against whiplash injuries and to effectively relieve of pressure the cervical vertebrae, the headrest should be at least 70 centimeters above the surface of the seat, and should be capable of being brought forward entirely against the back of the occupant's neck. Even a 1 inch distance between the occupant's back of the neck and the surface of the head rest may admit an unpermissible magnitude of impact energy.

Extensive tests with a large number of persons of different heights have shown that the vertical distance from the back of the neck to the plane of the surface of the backrest increases with the height of the person: in case of women, a linear function was found, while in case of men, the increase was found to be even more than linear. Thus, the height adjustment to conform to the body length has to be carried out in an angular range (with respect to the plane of the backrest which, due to the limited thickness of the backrest, excludes the possibility to dispose the adjusting mechanism within the backrest, since the extensions of the connecting lines of the required settings emerge from the back rest rearwardly immediately under its upper edge. Consequently, the pivotal axis of the angular movement of the headrest has to be disposed immediately above or immediately under the upper edge of the backrest and the height adjustment has to be effectuated above said pivotal axis.

The aforenoted pivotal axis has to be securely immobilized in all possible angular positions in such a manner as to render it capable of securely taking up the acceleration forces of the occupant's head in case of an accident. This is expediently achieved by self-locking and interengaging detent means, such as serrated wheels or wedging shafts, which may be loaded by shearing forces and which, although of small diameter, are capable of absorbing large forces by virtue of the multitude of engaging surfaces.

In order to prevent other occupants in the back seats from being injured by the headrests in case of an accident, the latter must be free of any protruding operating members. For this reason, according to the invention, the detent elements are urged into one another by spring means. For the purpose of performing an angular adjustment, the interengaging detent elements are disengaged by means of a lateral pressure exerted manually on the headrest. By appropriately sharpening the interengaging elements, it is achieved that, upon removal of said lateral disengaging pressure, the elements, under spring pressure, automatically reassume their interengaging, locking position in a self-aligning manner. Thus, the locking operation does not depend on a separate manual actuation and consequently, a secure locking can never be forgotten.

OBJECT AND SUMMARY OF THE INVENTION

It is an object of the invention to provide an improved adjustable headrest for vehicle seats that complies in all respects with current safety requirements.

Briefly stated, according to the invention, the headrest is supported by a pair of racks, the lower end of which is, within the upper portion of the backrest, affixed to a shaft means about which said headrest may pivot. Said shaft means is provided with spring-biased, interengaging, locking elements to immobilize the headrest in any of a plurality of angular positions. Said locking elements for said headrest are entirely enclosed in said backrest and may be disengaged by the application of a lateral manual force exerted to said headrest.

The headrest is slidable on said racks to any of a plurality of height positions in which said headrest may be immobilized by further locking means disposed in said headrest and associated with said racks. The locking means may be manually released by actuating a lever which extends outwardly from the cushion of the headrest in such a manner that it does not constitute a safety hazard.

The invention will be better understood and further objects as well as advantages will become more apparent from the ensuing detailed specification of several exemplary embodiments taken in conjunction with the drawings.

BRIEF DESCRIPTION OF THE DRAWINGS

FIG. 1 is a perspective view of one embodiment of the adjustable headrest;

FIG. 2 is a perspective view of a second embodiment of one part of the mechanism shown in FIG. 1; and FIG. 3 is a sectional side elevational view of the headrest shown in FIG. 1.

DESCRIPTION OF THE EMBODIMENTS

Turning now to FIG. 1, a headrest generally indicated at H is held on a backrest B by means of two spaced clamps 1 straddling the backrest B. The clamps 1 are stiffened by means of a transversely extending strut 2. Close to the top edge of the backrest B, to each clamp 1 there is secured an axially aligned bearing member 3. In one of the bearing members 3 there is axially slidably held a shaft 4 urged towards the other bearing member 3 by means of a coil spring 7. In the other bearing member 3 there is fixedly held a stub shaft 4a. Shaft 4 is adapted to be locked with respect to the stub shaft 4a by means of an interengaging crown gear assembly formed of a first half 5 secured to shaft 4 and a second half 6 affixed to stub shaft 4a. Normally, the spring 7 urges the shaft 4 to the right and causes the crown gear assembly to assume an interlocking position as illustrated in FIG. 1. In this position, no rotation of shaft 4 about its axis may take place.

To shaft 4 there are fixedly secured two spaced, parallel, upwardly extending support racks 10 which penetrate into the cushion 9 of headrest H and are associated, as will be described hereinafter in greater detail, with a height-adjusting mechanism. When an angular adjustment of the headrest H is desired, a manual force is exerted thereto in the direction of arrow A. As a result, the entire headrest, together with the two parallel support racks 10, shifts to the left overcoming the force of spring 7. Simultaneously, the crown gear assembly 5, 6 becomes disengaged so that the headrest H and the shaft 4 may rotate as a unit about the axis of shaft 4 and with respect to stub shaft 4a. When the desired angular position is reached, the aforenoted manual force is removed, whereupon spring 7 returns the headrest H and the shaft 4 into its position of rest, whereby the crown gears 5 and 6 again interengage and immobilize shaft 4 and headrest H in its new angular position.

FIG. 2 shows a modification of the locking mechanism for angular adjustment. In this embodiment the mechanism is fixedly built into the backrest B. A tubular frame 20, which may either be the backrest frame itself or may be attached thereto, terminates in two angularly bent portions which are in axial alignment adjacent the upper edge of the backrest B. The end portions of tubular frame 20 holds a shaft 4' which, in turn, carries a sleeve 21. One end of the sleeve 21 and an adjacent end of tubular terminal 20 is formed as an interengaging assembly 5', 6' similar to the crown gear assembly 5, 6 of FIG. 1. A spring 7 disposed about the shaft 4 urges slidable sleeve 21 to the right and causes an interlocking engagement of terminal parts 5', 6'. To the sleeve 21 there are secured two parallel spaced support racks 10 similar to the embodiment described in connection with FIG. 1. Angular adjustment of the headrest is effectuated identically to the operation described in connection with the embodiment depicted in FIG. 1.

Turning once again to FIG. 1 and also referring to FIG. 3, the support racks 10 extend into cushion 9 which is preferably made of foam rubber or foam plastic and which surrounds the height adjusting mechanism. Inside cushion 9 there is fixedly held a base plate 11. Each support rack 10 is partially surrounded by a guiding sleeve 12 affixed to the base plate 11. To each guiding sleeve 12 there is secured at one end of leaf spring 13 which, at the other end, carries a detent pin 14 adapted to be received by any of a plurality of longitudinally spaced openings 16 provided in support racks 10. Normally, the leaf spring 13 urges the pin 14 into its locking position as shown in FIG. 3. Between each guiding sleeve 12 and leaf spring 13 there is disposed, in the region of pin 14, a release lever 17, the lower terminal portion of which projects beyond the cushion 9 of the headrest H and is manually accessible. The exposed terminal portion of each lever 17 is preferably arcuate in shape and is at a dead angle with respect to the back of the occupant 22.

If height adjustment of the headrest is desired, the levers 17 are manually actuated, lifting thereby the detent pins 14 out of the opening 16 at both support racks 10. As a result, the headrest is freely movable up or down with respect to the support rack 10. If the desired new height position is reached, the actuating force is removed from the release lever 17, whereby the leaf springs 13 are free to urge pins 14 into engagement with an aligned new opening 16 of support racks 10. In case no opening 16 is in exact alignment with pins 14 when levers 17 are released, such alignment and subsequent locking will occur as soon as the occupant leans against the headrest. Thus, the possibility of failure to lock the headrest is practically excluded.

As seen in FIG. 1, the cushion 9 of the headrest H comprises two lateral, forwarding-extending ear portions 18. Such a headrest is particularly adapted to receive the head of a passenger-occupant. If the occupant is the driver, the ear portions 18 may disturb him. He may, while withdrawing pins 14 from openings 16, by applying manual force to levers 17, entirely remove the headrest from support racks 10 and replace it reversed, so that the portions 18 will extend backwardly and will thus no longer inconvenience him. Since the ear portions 18 extend beyond the highest region of the headrest cushion, the driver's head will have a secure support even if the ear portions 18 face rearwardly.

As shown in FIGS. 1 and 3, above the height adjusting mechanism within the cushion 9, there is disposed an elongated plastic protective cap 23 covering the end portions of base plate 11 and sleeves 12.

It is thus seen that the mechanisms associated with the angular and linear adjustability of the headrest are entirely hidden and do not constitute a safety hazard for either the occupant of the seat or for other persons in the vehicle.

We claim:
1. In an angularly and longitudinally adjustable headrest attached to the backrest particularly of vehicle seats, the improvement comprising:
  A. a horizontally disposed shaft axially slidably held below said headrest adjacent an upper edge of said backrest;
  B. a multitoothed first locking means associated with said shaft;
  C. spring means engaging said shaft and urging said first locking means into an interengaging relation preventing angular displacement of said shaft about its axis;
  D. support means affixed to said shaft and extending into said headrest;
  E. a second locking means held within said headrest and associated with said support means, said second locking means adapted to immobilize said support means with respect to said headrest in any one of a plurality of height positions thereof, said second locking means including manually operable disengaging lever means extending downwardly beyond said headrest; the portion of said lever means disposed externally of said headrest being at a dead angle with respect to the occupant, said first locking means adapted to be disengaged as long as a manual force is applied to said headrest in a direction substantially parallel to said shaft and opposing and overcoming the force of said spring means.

2. The improvement as defined in claim 1, wherein said first locking means is formed of a two-part crown gear assembly.

3. The improvement as defined in claim 1, wherein said shaft is held within said backrest.

4. The improvement as defined in claim 3, wherein said backrest has an internal frame, said shaft is formed of a sleeve and slidably held on said frame, one end of said sleeve and an adjacent end of said frame are formed to constitute said multitoothed first locking means.

5. The improvement as defined in claim 1, wherein said second locking means in said headrest is covered for safety purposes with a protective cap.

6. The improvement as defined in claim 1, wherein said second locking means in said headrest is embedded, with the exception of said portion of said lever means, in a foam cushion.

7. The improvement as defined in claim 1, wherein said headrest is adapted to be removed from said support means and to be inserted thereon in reverse.

8. The improvement as defined in claim 1, wherein said headrest includes a cushion having two laterally disposed ear portions extending beyond the highest region of said cushion.